US012100883B2

(12) United States Patent
Jeong et al.

(10) Patent No.: US 12,100,883 B2
(45) Date of Patent: Sep. 24, 2024

(54) ULTRAWIDE BANDWIDTH, LOW-COST, ROOF-TOP MOUNTABLE, LOW-PROFILE, MONOCONE ANTENNA FOR VEHICLE-TO-EVERYTHING (V2X) COMMUNICATION

(71) Applicant: THE BOARD OF TRUSTEES OF THE UNIVERSITY OF ALABAMA, Tuscaloosa, AL (US)

(72) Inventors: Nathan Seongheon Jeong, Tuscaloosa, AL (US); Wooseop Lee, Montgomery, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 0 days.

(21) Appl. No.: 18/324,269

(22) Filed: May 26, 2023

(65) Prior Publication Data

US 2023/0327319 A1 Oct. 12, 2023

Related U.S. Application Data

(62) Division of application No. 17/484,021, filed on Sep. 24, 2021, now Pat. No. 11,705,618.

(60) Provisional application No. 63/085,499, filed on Sep. 30, 2020.

(51) Int. Cl.

| | |
|---|---|
| ***H01Q 1/32*** | (2006.01) |
| ***H01Q 1/22*** | (2006.01) |
| ***H01Q 5/328*** | (2015.01) |
| ***H01Q 5/50*** | (2015.01) |

(52) U.S. Cl.
CPC ............. *H01Q 1/2241* (2013.01); *H01Q 1/32* (2013.01); *H01Q 5/328* (2015.01); *H01Q 5/50* (2015.01)

(58) Field of Classification Search
CPC ...... H01Q 1/2241; H01Q 1/32; H01Q 1/3233; H01Q 5/328; H01Q 5/50; H01Q 5/385; H01Q 13/02
See application file for complete search history.

(56) References Cited

U.S. PATENT DOCUMENTS

| | | | | |
|---|---|---|---|---|
| 9,093,741 B1 * | 7/2015 | Weller | H01Q 1/007 | |
| 2008/0117113 A1 * | 5/2008 | Haziza | H01Q 13/0233 | 343/786 |
| 2011/0279339 A1 * | 11/2011 | Johnston | H01Q 13/02 | 343/786 |
| 2015/0145741 A1 * | 5/2015 | Moulder | H01Q 1/525 | 343/773 |
| 2016/0043472 A1 * | 2/2016 | Fasenfest | H01Q 13/02 | 343/786 |

(Continued)

*Primary Examiner* — Awat M Salih
(74) *Attorney, Agent, or Firm* — Meunier Carlin & Curfman LLC

(57) ABSTRACT

A monocone antenna is described for V2X wireless communications. To achieve ultrawide bandwidth, low-profile, omnidirectional radiation, an implementation comprises various components including a circular monocone, a capacitive feed, a ring with grounding vias, capacitive bars, and conductive cylinders. Another implementation comprises a monocone, a capacitive feed, a ground ring with grounding vias, a plurality of first meander lines, each having a first size, and a plurality of second meander lines each having a second size, wherein the second size is larger than the first size.

13 Claims, 17 Drawing Sheets

(56) References Cited

U.S. PATENT DOCUMENTS

2019/0103676 A1* 4/2019 Sugimoto ................ H01Q 1/42
2020/0273773 A1* 8/2020 Wan ...................... H01L 21/568

* cited by examiner

Open circuited for 4 capacitive bars

Open circuited for 8 capacitive bars
(two closed at via)

Short circuited for 4 capacitive bars

Short circuited for 8 capacitive bars

| |
|---|
| $R_1$= 74mm |
| $R_2$= 55mm |
| $\theta_1$= 35 degree |
| $\theta_2$= 90 degree |
| $V_T$= 2mm |

ULTRAWIDE BANDWIDTH, LOW-COST, ROOF-TOP MOUNTABLE, LOW-PROFILE, MONOCONE ANTENNA FOR VEHICLE-TO-EVERYTHING (V2X) COMMUNICATION

CROSS-REFERENCE TO RELATED APPLICATIONS

The application is a divisional of, and claims priority to, U.S. patent application Ser. No. 17/484,021, filed on Sep. 24, 2021, entitled "ULTRAWIDE BANDWIDTH, LOW-COST, ROOF-TOP MOUNTABLE, LOW-PROFILE, MONOCONE ANTENNA FOR VEHICLE-TO-EVERYTHING (V2X) COMMUNICATION," which claims priority to U.S. Provisional Patent Application No. 63/085,499, filed on Sep. 30, 2020, entitled "ULTRAWIDE BANDWIDTH, LOW-COST, ROOF-TOP MOUNTABLE, LOW-PROFILE, MONOCONE ANTENNA FOR VEHICLE-TO-EVERYTHING (V2X) COMMUNICATION" The contents of both are hereby incorporated by reference in their entireties.

BACKGROUND

To prevent car accidents and increase road safety, the technology of V2X (vehicle-to-everything) wireless communication has been heavily developed in two main areas of DSRC (dedicated short range communication) and cellular-V2X. V2X can be categorized with four components: V2V (vehicle-to-vehicle), V2I (vehicle-to-infrastructure), V2N (vehicle-to-network), and V2P (vehicle-to-pedestrian).

Current vehicles in the market (such as cars, unmanned aerial vehicles (UAVs) such as drones, IoT devices, ships, airplanes, helicopters, etc.) use various discrete modular antenna elements to support different frequency bands for each communication band. Therefore, it is critical to reduce the number of antennas on vehicles while covering the various frequency bands.

It is with respect to these and other considerations that the various aspects and embodiments of the present disclosure are presented.

SUMMARY

A monocone antenna is described for V2X wireless communications. To achieve ultrawide bandwidth, low-profile, omnidirectional radiation, an implementation of the antenna comprises various components including a circular monocone, a capacitive feed, a ring with grounding vias, capacitive bars, and conductive cylinders. The antenna is modeled with electromagnetic simulator and validated with measurement. The results show that the antenna supports ultrawide bandwidth of 0.7 GHz to 6 GHz mounted on a large ground plane, allowing GSM, CDMA, UMTS, LTE, GPS, WiFi, BT, DSRC, and C-V2X.

An implementation of the antenna is 3D printed with low-cost material and sprayed with copper particles for rapid and cost-effective production. It is contemplated that other metal particles including silver, gold, and aluminum can be used too depending on the implementation. The diameter of the antenna is 148 mm and height is 25 mm More than 87% of efficiency is measured above 1.7 GHz to 6 GHz, while 43% of efficiency is observed at 0.7 GHz in an anechoic chamber. Omnidirectional patterns on both azimuth and elevation principle planes are observed with more than 0.5 dBi of the realized gain over the frequency band of interest to support V2X communication.

Implementations of the antenna described herein distinctively use parasitic elements and capacitive feed with monocone to maximize its radiation over broad bandwidth.

Implementations of the monocone antenna described herein support all frequency bands including 2G, 3G, 4G, sub-6 GHz 5G, WiFi, Bluetooth, GPS, DSRC, and C-V2X.

In an implementation, an antenna comprises: a monocone; a capacitive feed; a ground ring with a plurality of grounding vias; a plurality of capacitive bars; and a plurality of conductive cylinders.

Implementations may include some or all of the following features. The ground ring is a planar ring, the capacitive bars are conductive strips, and the conductive cylinders are cylindrical disks. The monocone is tapered and has a top hat that is covered. The ground ring is physically separated from the monocone. The capacitive feed is positioned at the bottom of the monocone. The antenna further comprises a planar top disposed on the monocone, wherein the conductive cylinders and the capacitive bars are positioned on the planar top, and wherein the capacitive bars are distributed over the planar top. The conductive cylinders are positioned between the capacitive bars. The antenna comprises four capacitive bars and wherein the ground ring is open-circuited or is short-circuited. The antenna comprises eight capacitive bars and wherein the ground ring is open-circuited or is short-circuited. The antenna is 3D printed and sprayed with metal particles. The antenna is configured to achieve ultrawide bandwidth, low-profile, omnidirectional radiation. The antenna is configured to support ultrawide bandwidth of 0.7 GHz to 6 GHz. The antenna is configured to allow GSM, CDMA, UMTS, LTE, GPS, WiFi, BT, DSRC, and C-V2X. The antenna is for V2X (vehicle-to-everything) wireless communication.

In an implementation, an antenna comprises: a monocone; a capacitive feed; a ground ring with a plurality of grounding vias; a plurality of first meander lines, each having a first size; and a plurality of second meander lines, each having a second size, wherein the second size is larger than the first size.

Implementations may include some or all of the following features. The ground ring is a planar ring, and each of the first meander lines is located on a first degree from a reference line, and each of the second meander lines is located on a second degree from the reference line, wherein the second degree is different from the first degree. The first meander lines are vertically positioned from the ground ring to the ground plane, and wherein the second meander lines are vertically positioned from the ground ring to the ground plane. The monocone is tapered and has a top hat that is covered, wherein the capacitive feed is positioned at the bottom of the monocone, and further comprising a planar top disposed on the monocone. The antenna is configured to support ultrawide bandwidth of 750 MHz to 7.45 GHz. The antenna is configured to allow GSM, CDMA, UMTS, LTE, GPS, WiFi, BT, DSRC, and C-V2X. The antenna is for V2X (vehicle-to-everything) wireless communication. Grounding posts are vertically positioned near the capacitive feed.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

The description is not to be taken in a limiting sense, but is made merely for the purpose of illustrating the general principles of the invention, since the scope of the invention is best defined by the appended claims.

Various inventive features are described herein that can each be used independently of one another or in combination with other features.

Vehicle-to-everything (V2X) includes vehicle-to-pedestrian (V2P), vehicle-to-infrastructure (V2I), vehicle-to-network (V2N), and vehicle-to-vehicle (V2V), and intelligently connects the car to the cloud and its surroundings. V2X communication is essential for safety and road awareness. V2X is composed of V2V, V2I, V2V, and V2P and can be used for both current non autonomous and future autonomous driving. V2X includes both DSRC (dedicated short range communication) and cellular-V2X (C-V2X).

A monocone antenna described herein shows ultrawide bandwidth covering 0.7 to 6 GHz for V2X application. It shows characteristics of being low-profile, light, low-cost, and vehicle roof-mountable. The simulated and measured reflection coefficient, radiation pattern, efficiency and gain indicate that the radiation performance of the proposed antenna is suitable for vehicle communication. Implementations described herein provide ultrawide bandwidth low profile, low cost, roof top mountable, lightweight, and single element monocone antenna that support all frequency bands including 2G, 3G, 4G, sub-6 GHz, 5G, WiFi, Bluetooth, GPS, DSRC, and C-V2X supporting from 0.7 GHz to 6 GHz. Although implementations of the antenna are described herein with respect to a vehicle such as a car, it is contemplated that the antenna can be used with (e.g., applied to) an unmanned aerial vehicle (UAV) such as drone, an IoT device, a ship, an airplane, a helicopter, etc. and anywhere a big ground plane is present under the antenna. In some implementations, the antenna utilizes the ground plane as a part of the radiator.

Implementations described herein distinctively use parasitic elements and capacitive feed with monocone to maximize its radiation over broad bandwidth.

Key components include a capacitive bar, a circular conductor, a planar top, a monocone, a ground ring, a capacitive feed, and vias.

Figure 1A:
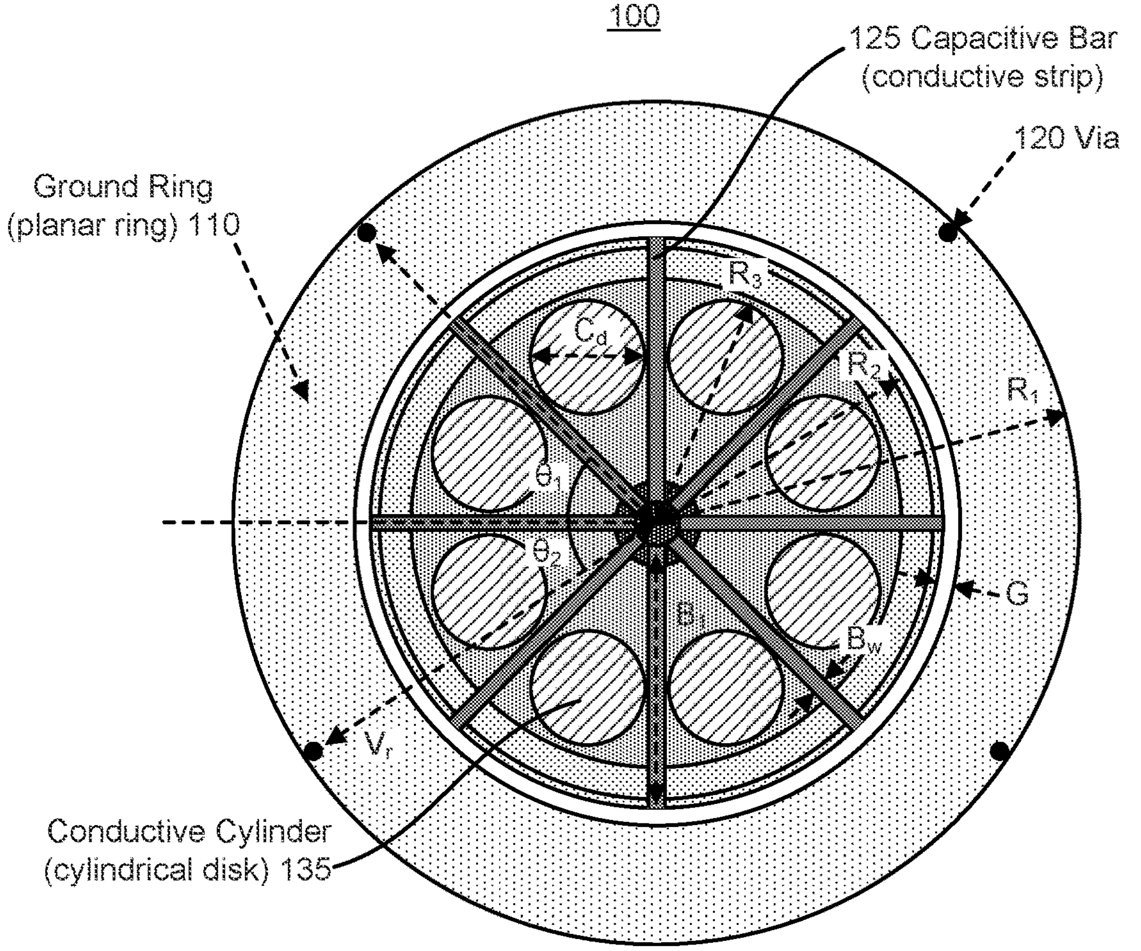
FIGS. 1A and 1B are illustrations of an implementation of an antenna with components in top view and side view, respectively.
Figure 1B:
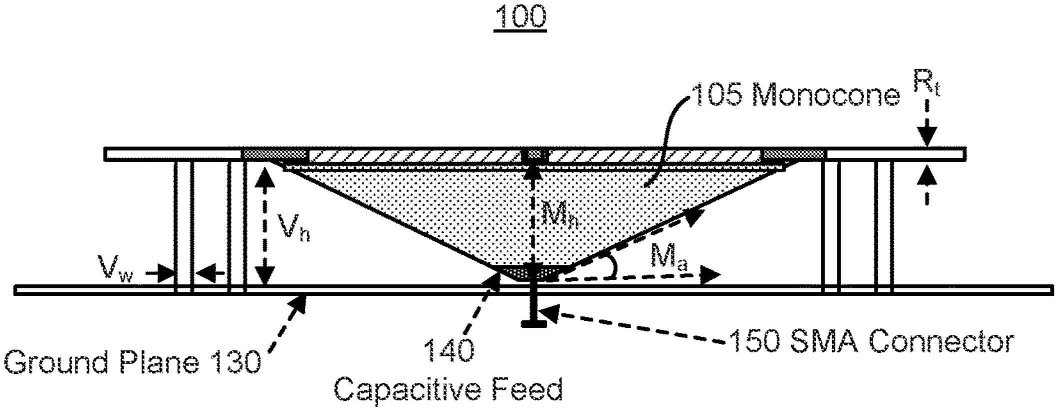

FIGS. 1A and 1B are illustrations of an implementation of an antenna 100 with components in top view and side view, respectively.

The antenna 100 comprises a monocone 105, a capacitive feed 140, a ground ring (also referred to as a planar ring) 110 with grounding vias 120, capacitive bars (also referred to as conductive strips) 125, and conductive cylinders (also referred to as cylindrical disks) 135.

The tapered monocone 105 provides broad bandwidth by setting its height (Mh) and half cone angles ($M_a$). Unlike other monocones made with a solid metal, the top hat is covered while the center of the monocone 105 is kept hollow.

In an implementation, the longest length from the bottom tip to the open-end edge of the monocone 105 is only 52 mm which is equivalent to 0.12λ where λ is a wavelength of the lowest frequency in the air. This length primarily determines the lowest resonant frequency. These dimensions and values are not intended to be limiting, and any dimensions and values may be used depending on the implementation.

The capacitive feed 140 is incorporated to allow broad impedance matching over the frequency band of interest. A tapered V-shape capacitive feed 140 is designed and positioned at the bottom of the monocone 105.

In an implementation, the height and upper radius of the capacitive feed 140 are defined as 2.2 mm and 14.8 mm, respectively. The gap (Gap) between the monocone 105 and the capacitive feed 140 may be filled with a thin-film dielectric with permittivity ($\epsilon_r$) of 3.6 and loss tangent (tan δ) of 0.002. These dimensions and values are not intended to be limiting, and any dimensions and values may be used depending on the implementation.

The ground ring 110 is placed beside the open-ended edge of the monocone 105 with a small spacing (S) and is grounded through four cylindrical vias 120. The spacing S between the monocone 105 and the ring 110 controls the amount of capacitive coupling along the perimeter of the monocone 105. The inner and outer radii of the ring 110 are denoted as $R_2$ and $R_1$, respectively. The location of the grounding via 120 is defined by radius from the center of the monocone ($V_r$), while the via 120 diameter is indicated as $V_d$. In addition, the upper side angle ($\theta_1$) and lower side angle ($\theta_2$) are defined from the horizontal center line.

The open-ended capacitive bars 125 and the cylindrical disks 135 are added on top of the monocone 105 to provide additional impedance matching capability. The width and length of each capacitive bar 125 are defined by its width ($B_w$) and ($B_1$), respectively. The diameter of each cylindrical disk 135 (C) is denoted as Cd.

In an implementation, a 1 mm-thick FR4 with $\epsilon_r$=4.4 and tan $\delta$=0.02 is used as the ground plane 130. A 50Ω SMA connector 150 is modeled to precisely represent the measurement condition. These dimensions and values are not intended to be limiting, and any dimensions and values may be used depending on the implementation. The center and outer conductors of the SMA connector 150 are physically touched to the capacitive feed 140 and ground plane 130, respectively.

In an implementation, optimized design parameters are shown in Table 1. The overall height and diameter of the antenna 100 in the implementation are 25 mm and 148 mm, respectively. These dimensions and values are not intended to be limiting, and any dimensions and values may be used depending on the implementation.

TABLE 1

Example parameter values according to an implementation

| Parameter | Values | Parameter | Values | Parameter | Values |
|---|---|---|---|---|---|
| $M_h$ | 25 mm | Gap | 3 mm | Gap | 100 μm |
| $M_a$ | 20° | $V_h$ | 23 mm | $B_w$ | 2.5 mm |
| $R_1$ | 74 mm | $V_r$ | 70 mm | $B_1$ | 46 mm |
| $R_2$ | 50 mm | $V_d$ | 3 mm | $C_d$ | 20 mm |
| $R_3$ | 41.35 mm | $V_w$ | 3 mm | $R_t$ | 2 mm |
| $C_1$ | 20 mm | | | | |

In some implementations, 3D-printing and Cu-spraying are used in the fabrication of the antenna 100.

In some implementations, the components of the antenna 100 are made of low-cost and rigid polylactic acid plastic (PLA) material. A 3D printer (e.g., Dramel 3D45) may be used to precisely fabricate the antenna 100 geometry. To make lightweight, cost effective, and electrically conductive, MG Chemical's Super Shield copper conductive particles (843AR-140G) may be utilized for metallization, and sprayed to the components followed by drying for 40 minutes without any directly blown air to the antenna itself at a room temperature. The conductive spray coated only once to cover all PLA material of the antenna 100. The conductivity of the copper particle is 3300 S/cm which is almost 200 times less conductive relative to the industrial copper cladding. For further cost and weight reduction, the center of the monocone 105 is set to be hollow with the 3D printing. Electrical connection of the vias 120 to the ground plane 130 is also realized with the same spraying method. Note that the traditional method of soldering lead is not suitable for component connections because the melting temperature point of the base plastic materials is 130-180 degrees and lower than soldering temperature. This straightforward metallization is desirable to rapid mass production and cost reduction. To maintain uniform gap between the monocone 105 and the capacitive feed 140, a 100 μm-thick Kapton tape is inserted between them. These dimensions and values are not intended to be limiting, and any dimensions and values may be used depending on the implementation.

Figure 2:
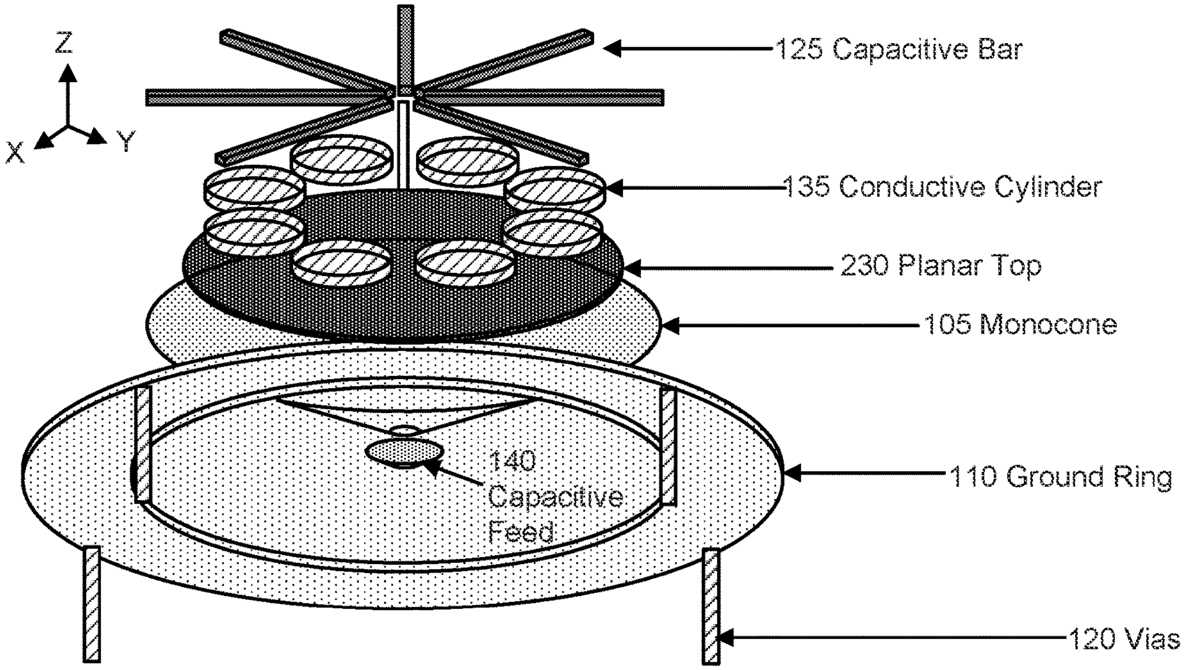
FIG. 2 is an illustration of an implementation of an antenna in teardown view with key components.

FIG. 2 is an illustration of an implementation of the antenna in teardown view with key components described with respect to FIGS. 1A and 1B, including the capacitive bars 125, the conductive cylinders 135, the monocone 105, the ground ring 110, the capacitive feed 140, and the vias 120. Also shown is a planar top 230 which is disposed on the monocone 105 and on which the conductive cylinders 135 and the capacitive bars 125 may be positioned. It is noted that the parts can be 3D printed. Copper conductive particles may be utilized for metallization.

Figure 3A:
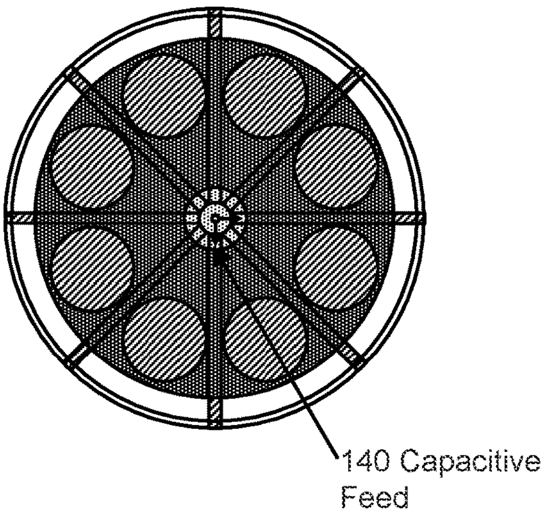
FIGS. 3A and 3B are illustrations directed to the feature of a capacitively fed monocone in top view and side view, respectively.
Figure 3B:
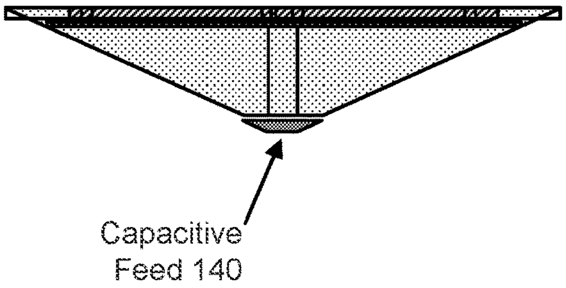
Figure 4A:
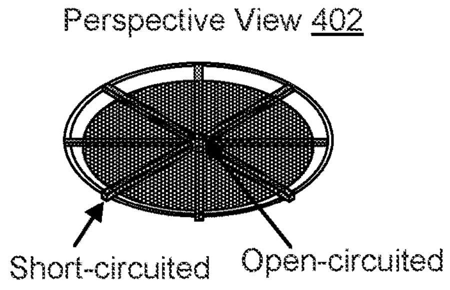
FIGS. 4A, 4B, 4C, and 4D are illustrations directed to the feature of a conductive strip in perspective view, top view, and side views, respectively.
Figure 4B:
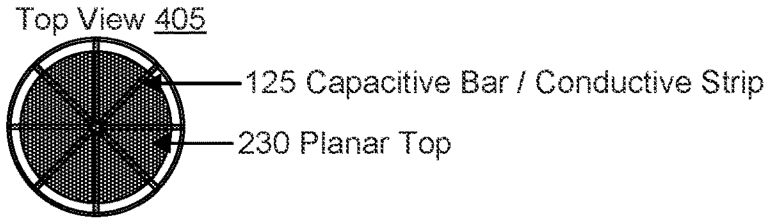
Figure 4C:
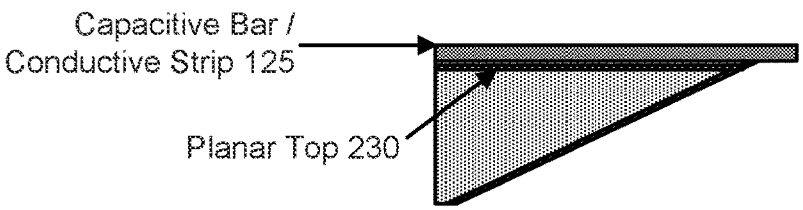
Figure 4D:
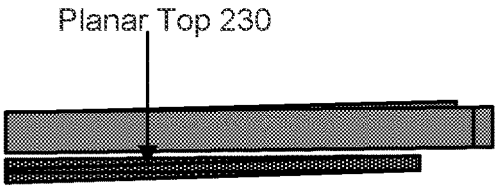

FIGS. 3A and 3B are illustrations directed to the feature of a capacitively fed monocone in top view and side view, respectively. The capacitive feed 140 is shown in top view and in side view in FIGS. 3A and 3B, respectively.

The exciting radio energy is coupled through the tapered V-shape capacitive feed 140 at the bottom of the monocone 105. This feeding method significantly improves the input impedance over all frequency bands.

In an implementation, the distance between the monocone and the V shape feed is maintained at 0.16 mm using a layer of a kapton tape, although other distances and materials may be used depending on the implementation.

FIGS. 4A, 4B, 4C, and 4D are illustrations directed to the feature of a conductive strip (i.e., capacitive bar) 125 disposed on a planar top 230 in perspective view, top view, and side views, respectively. A perspective view 402 is shown along with a top view 405. The eight conductive strips 125 create capacitive coupling between the planar top 230 and the conductive strips 125. The conductive strips 125 are uniformly distributed over the planar top 230. For example, 45 degrees of angle apart from each other, although other values may be used depending on the implementation. Only the end of conductive strips 125 are connected on the monocone 105.

Figure 5A:
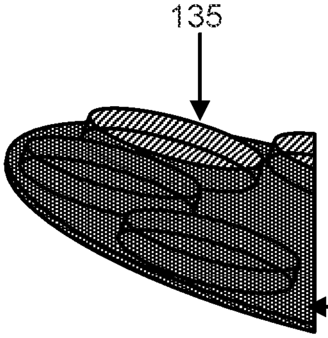
FIGS. 5A, 5B, and 5C are illustrations directed to the feature of a cylindrical conductor on the planar top in perspective view, top view, and side view, respectively.
Figure 5B:
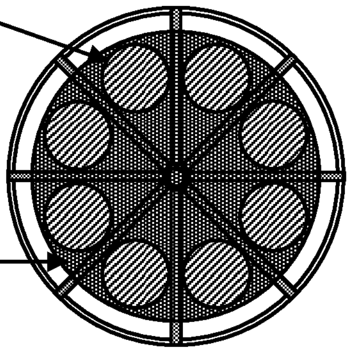
Figure 5C:
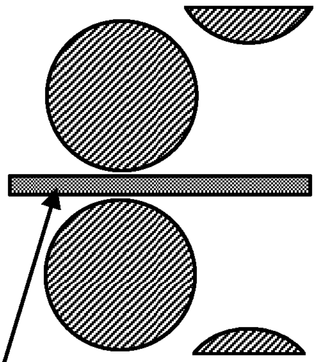

FIGS. 5A, 5B, and 5C are illustrations directed to the feature of a cylindrical conductor (e.g., cylindrical disk) 135 on the planar top 230 in perspective view, top view, and side view, respectively. The cylindrical conductor disks 135 increase and adjust capacitance between conductive strips 125, providing critical impedance matching of the antenna 100. The disks 135 are attached to the planar top 230. The disk size controls matching. Each disk 135 is positioned between the conductive strips 125.

Figure 6:
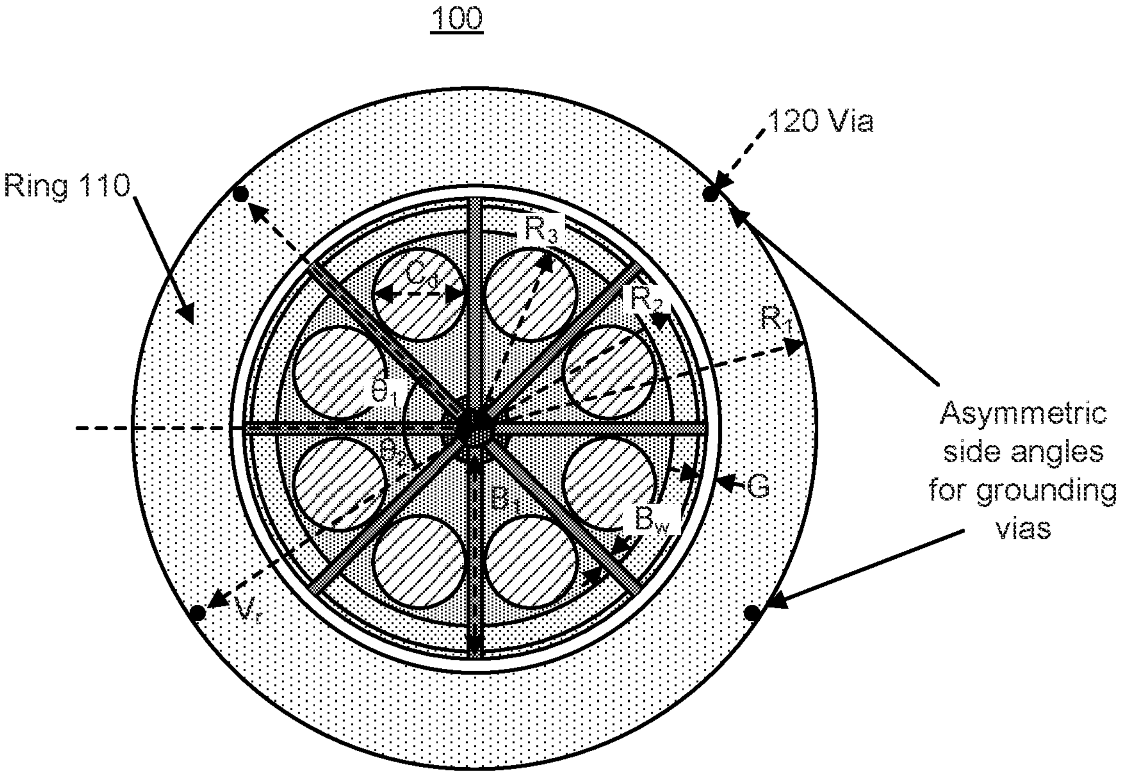
FIG. 6 is an illustration directed to the feature of a ring with grounding vias.

FIG. 6 is an illustration directed to the feature of a ring 110 with grounding vias 120. The lowest resonant frequency (0.7 GHz) is primarily provided by help with the ring 110 and the grounding vias 120. The gap between the open-ended monocone 105 and the ring 110, the number of vias 120, and side angles of the vias 120 affect the low, middle, and high frequencies.

Figure 7A:
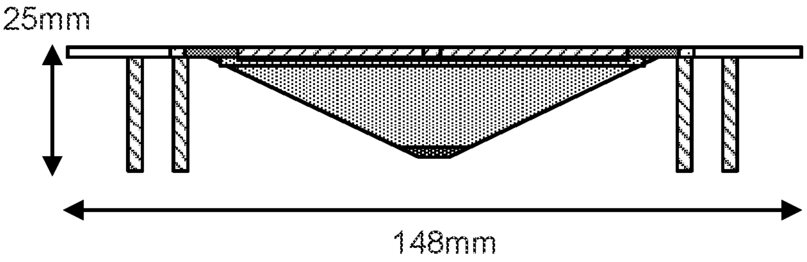
FIGS. 7A and 7B are illustrations directed to the feature of size being ultra-compact for multi-band operation in side view and top view, respectively.
Figure 7B:
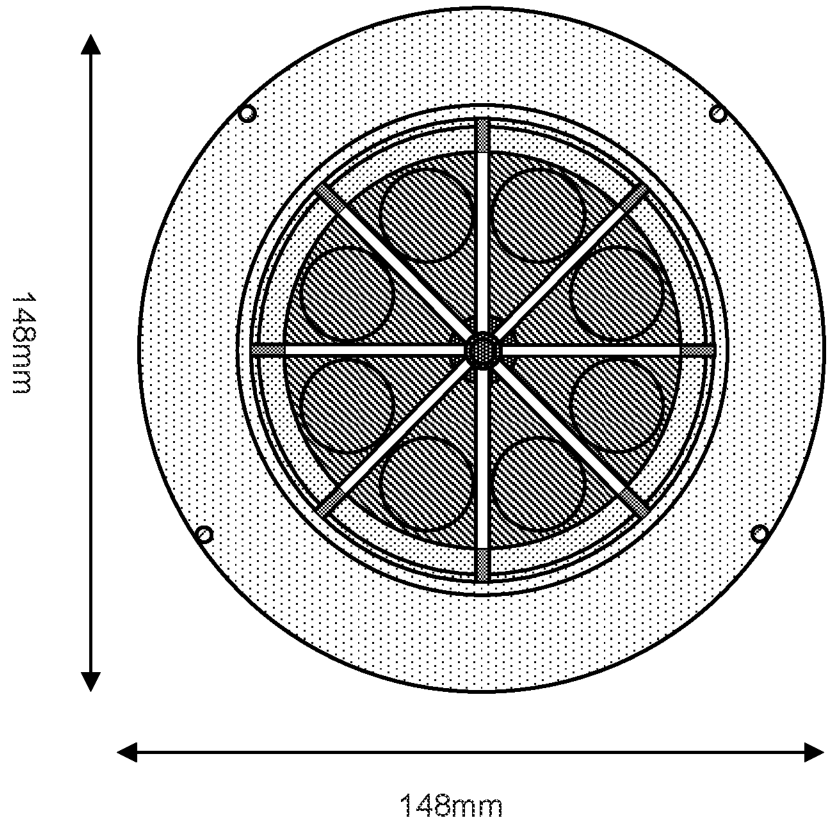

FIGS. 7A and 7B are illustrations directed to the feature of size of the antenna 100 being ultra-compact for multi-band operation in side view and top view, respectively. In an implementation, the dimension of the antenna 100 is 148×148×25 $mm^3$ which is much smaller to be mounted on the vehicle roof than the current commercial roof top antenna which supports several frequency bands only. This is the smallest antenna in size to cover the entire communication bands. These dimensions and values are not intended to be limiting, and any dimensions and values may be used depending on the implementation.

Figure 8:
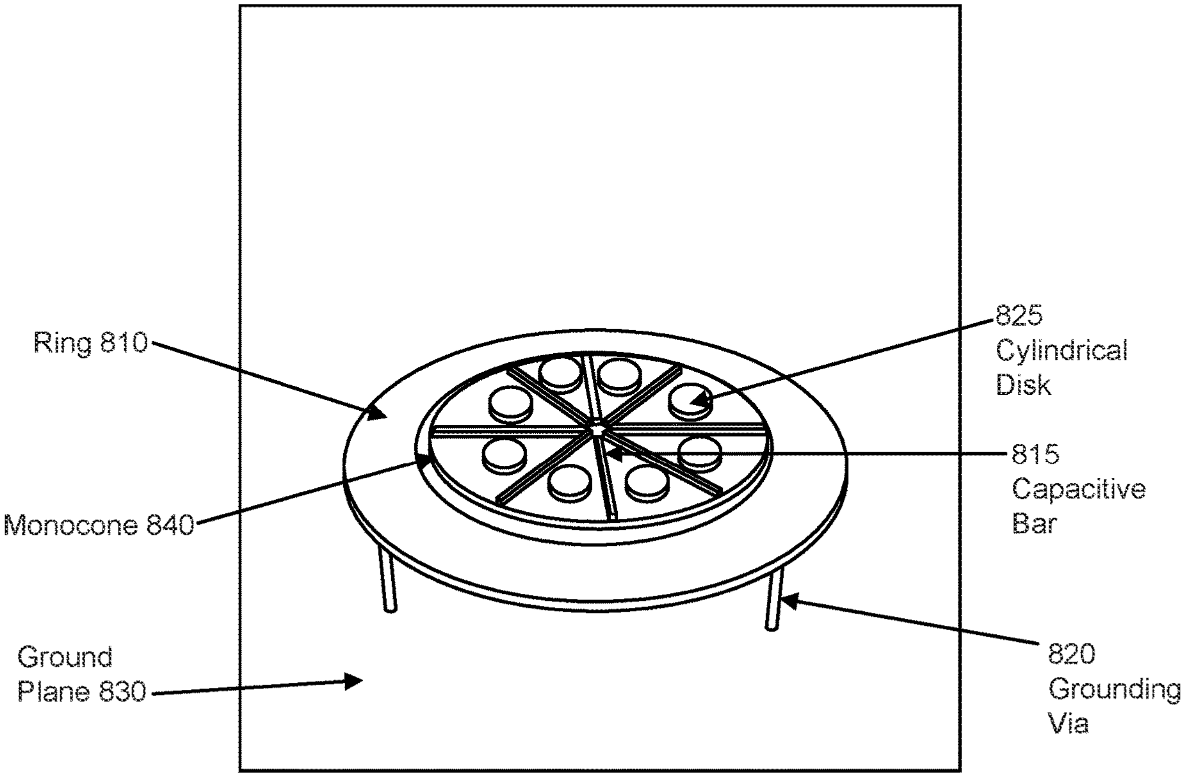
FIG. 8 is an illustration of an implementation of a prototype antenna.

FIG. 8 is an illustration of an implementation of a prototype antenna 100. The fabricated prototype includes a ring 810, capacitive bars 815, grounding vias 820, cylindrical disks 825, a ground plane 830, and a monocone 840. High gain and efficiency were measured.

Figure 9A:
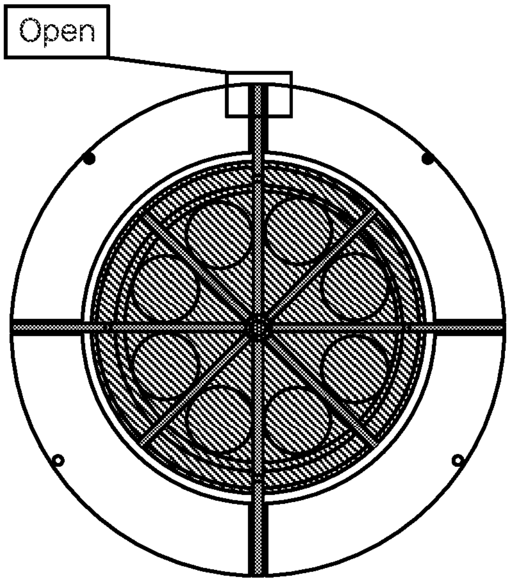
FIGS. 9A and 9B are illustrations of an implementation of an antenna with an open-circuited ground ring with four capacitive bars and eight capacitive bars, respectively.
Figure 9B:
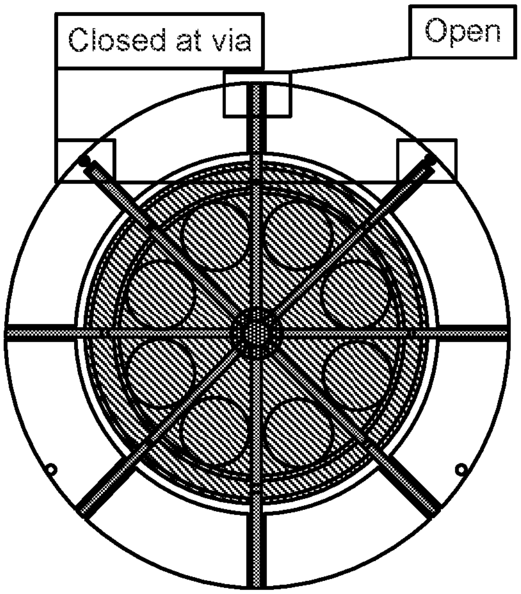

FIGS. 9A and 9B are illustrations of an implementation of an antenna with an open-circuited ground ring with four capacitive bars and eight capacitive bars, respectively. A capacitive bar extends to the ground ring and creates capacitive coupling between the bar and the ground ring. In FIG. 9A, there are four capacitive bars extended and the ground ring is open-circuited. The ring is thus divided into four individual sections. In FIG. 9B, there are eight capacitive bars extended and the ground ring is open-circuited except where two upper vias are located.

Figure 10A:
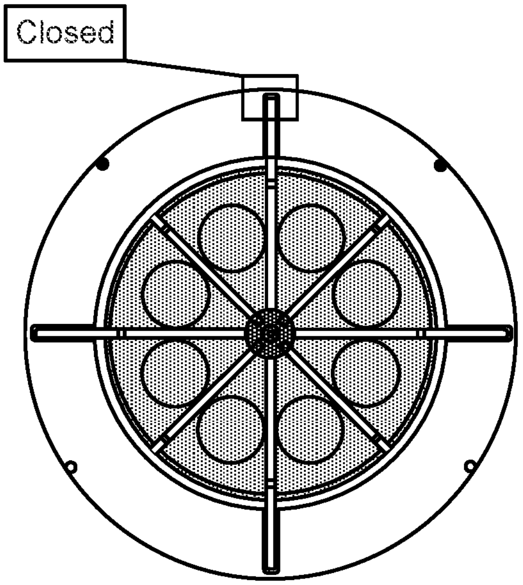
FIGS. 10A and 10B are illustrations of an implementation of an antenna with a short-circuited ground ring with four capacitive bars and eight capacitive bars, respectively.
Figure 10B:
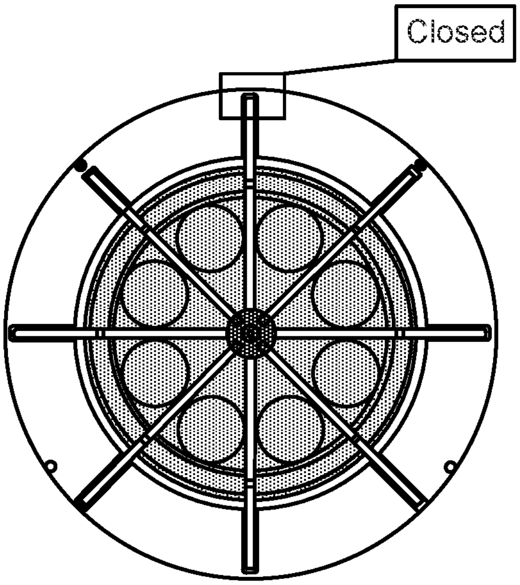

FIGS. 10A and 10B are illustrations of an implementation of an antenna with a short-circuited ground ring with four capacitive bars and eight capacitive bars, respectively. A capacitive bar extends to the ground ring and creates capacitive coupling between the bar and the capacitive bars. In FIG. 10A, there are four capacitive bars extended while the ground ring is short-circuited. In FIG. 10B, there are eight capacitive bars extended while the ground ring is short-circuited.

As described further herein, some implementations of a monocone antenna are contemplated to have neither capacitive bars nor conductive cylinders. Such implementations include features such as low profile design, capacitive feeding, grounding post near capacitive feed, one or more short meander lines, and/or one or more long meander lines. The short meander lines may be a first plurality of meander lines, and the long meander lines may be a second plurality of meander lines, in some implementations.

Figure 11A:
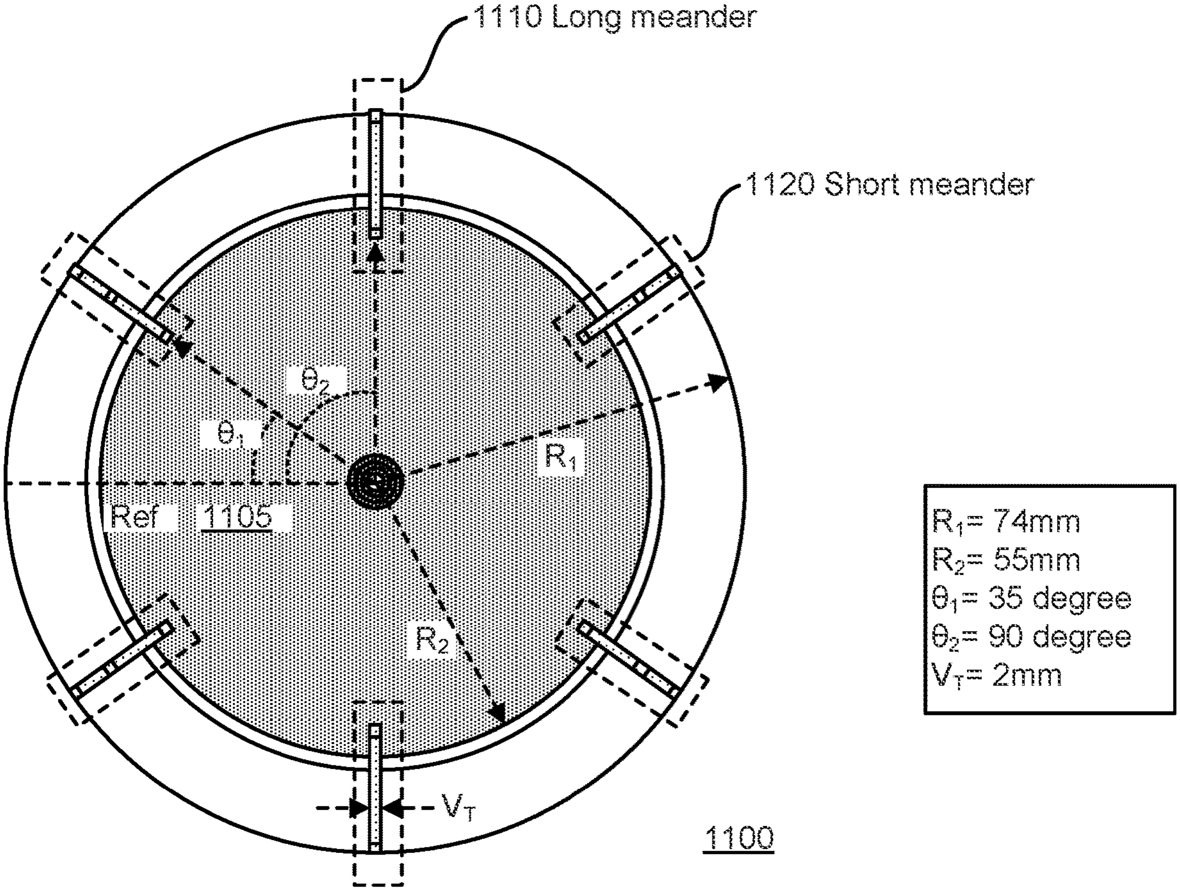
FIGS. 11A and 11B are illustrations of an implementation of an antenna in top view and side view, respectively.
Figure 11B:
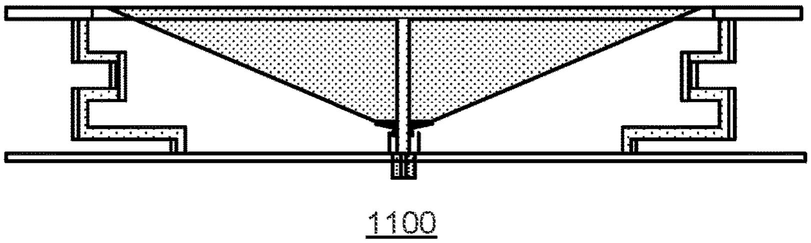

FIGS. 11A and 11B are illustrations of another implementation of an antenna 1100 in top view and side view, respectively. The monocone antenna 1100 has no need of capacitive bars and conductive cylinders. There are six meander lines to support better resonance and broadband impedance matching. There are four short meander line 1120 vias located on 35 degree from a reference line 1105, and two long meander line 1110 vias located 90 degrees from the reference line 1105. In this example, the diameter is 148 mm, and the height is 26.695 mm $R_1$=74 mm, $R_2$=55 mm, $\theta_1$=35 degrees, $\theta_2$=90 degrees, $V_T$=2 mm.

Figure 12:
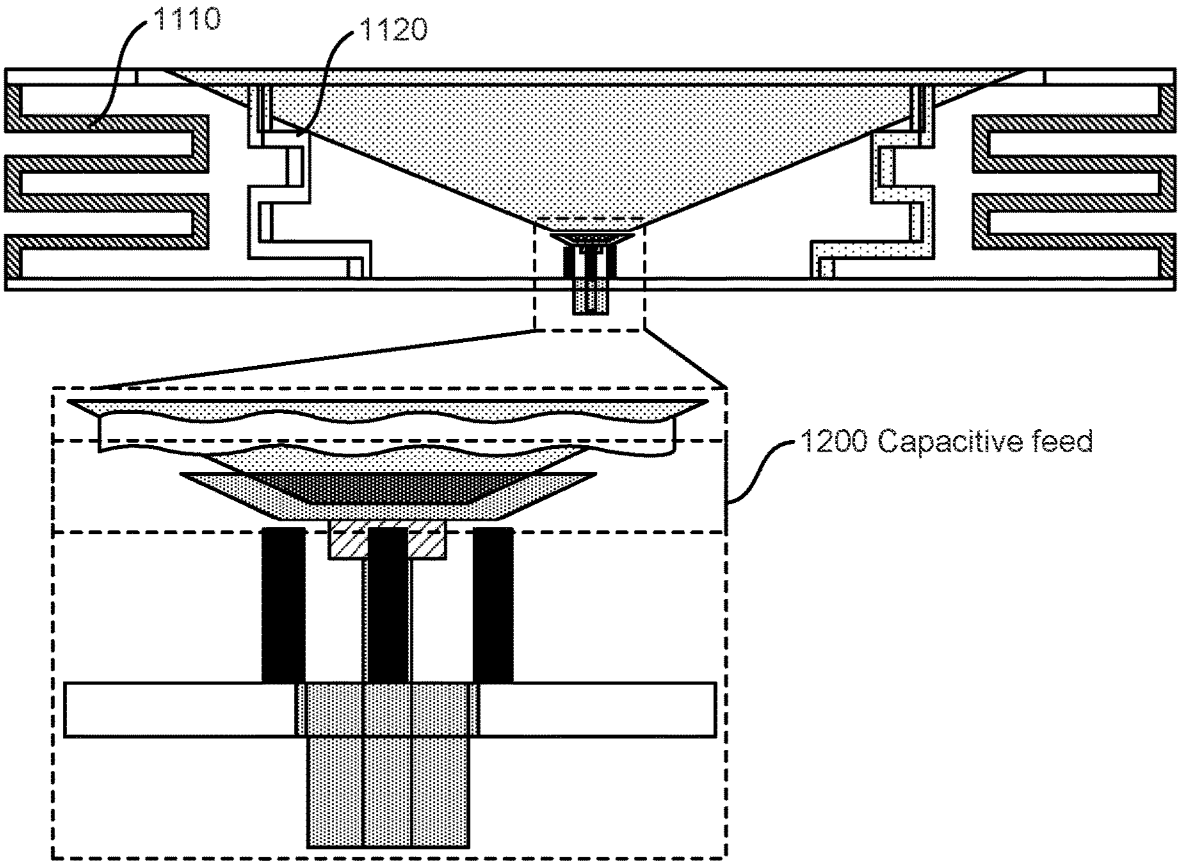
FIG. 12 is an illustration of an implementation of an antenna showing a capacitive feed.

FIG. 12 is an illustration of an implementation of an antenna, such as the antenna 1100, showing a capacitive feed 1200. The capacitive feed is use for antenna excitation. There is no direct physical connection and effective low-frequency broadband characteristic. SMA connector and coax line are designed and simulated to emulate correct result. The outer part of SMA is attached to the top of substrate, serving an electrical ground.

Figure 13A:
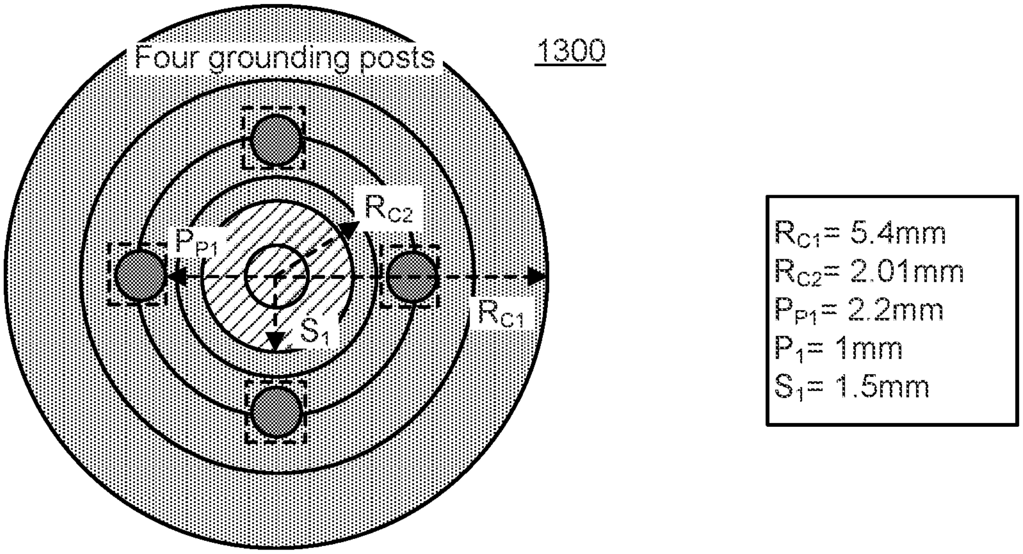
FIGS. 13A and 13B are illustrations of an implementation of an antenna with capacitive grounding posts in top view and side view, respectively.
Figure 13B:
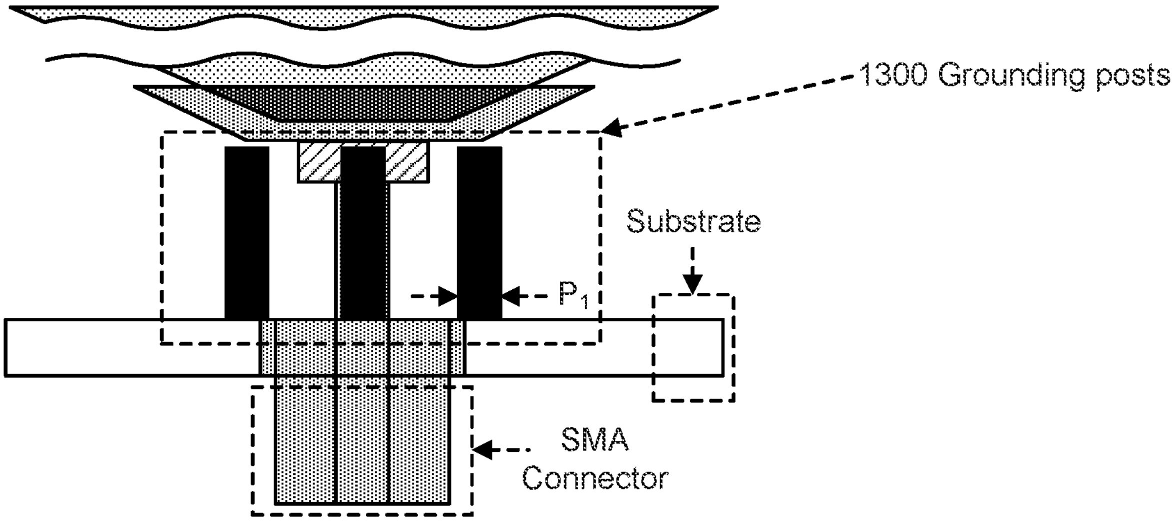

FIGS. 13A and 13B are illustrations of an implementation of an antenna 1100 with capacitive grounding posts 1300 in top view and side view, respectively. Four capacitive grounding posts 1300 are provided for better impedance matching on near 700 MHz region. In an example, the diameter of each grounding post 1300 is 1 mm $R_{C1}$=5.4 mm, $R_{C2}$=2.01 mm, $P_{P1}$=2.2 mm, $P_1$=1 mm, and $S_1$=1.5 mm.

Figure 14A:
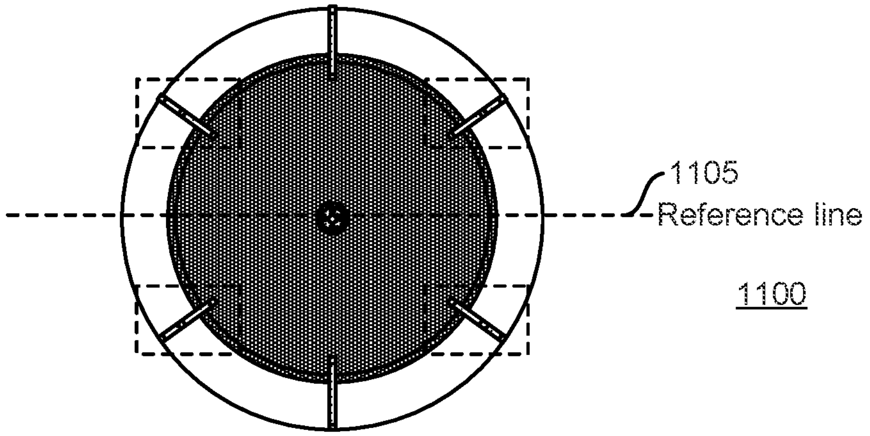
FIG. 14A is an illustration an implementation of an antenna in top view.
Figure 14B:
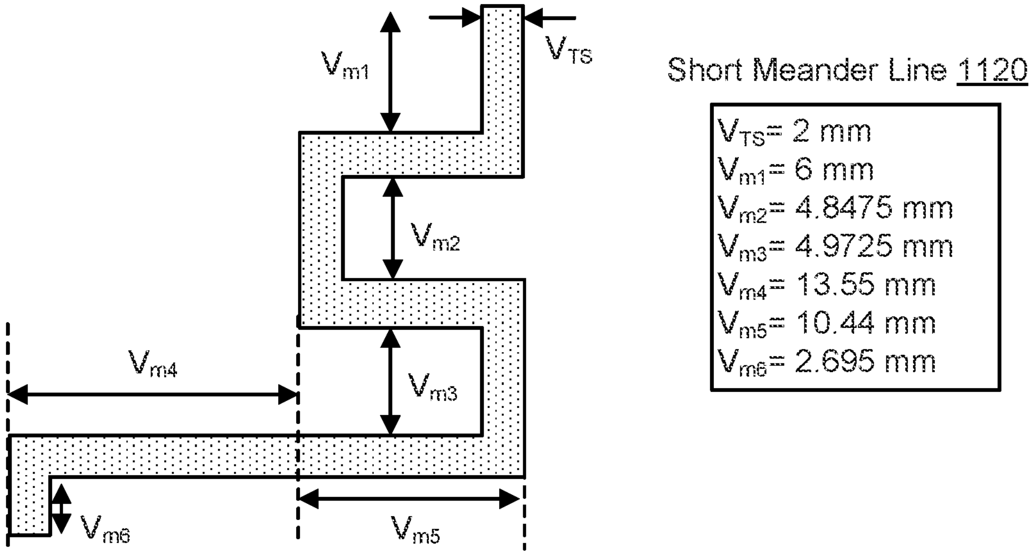
FIG. 14B is an illustration of a short meander line of the antenna of FIG. 14A.

Another feature is a short meander line. FIG. 14A is an illustration an implementation of an antenna 1100 in top view, and FIG. 14B is an illustration of a short meander line 1120 of the antenna of FIG. 14A. The short meander line 1120 applies impedance matching at the 700 MHz region. It applies a frequency shift at the 3.5 GHz region. Four short meander line 1120 vias are located 35 degrees from the reference line 1105, in an implementation.

With respect to FIG. 14B, $V_{TS}$=2 mm, $V_{m1}$=6 mm, $V_{m2}$=4.8475 mm, $V_{m3}$=4.9725 mm, $V_{m4}$=13.55 mm, $V_{m5}$=10.44 mm, and $Vm_6$=2.695 mm.

Figure 15A:
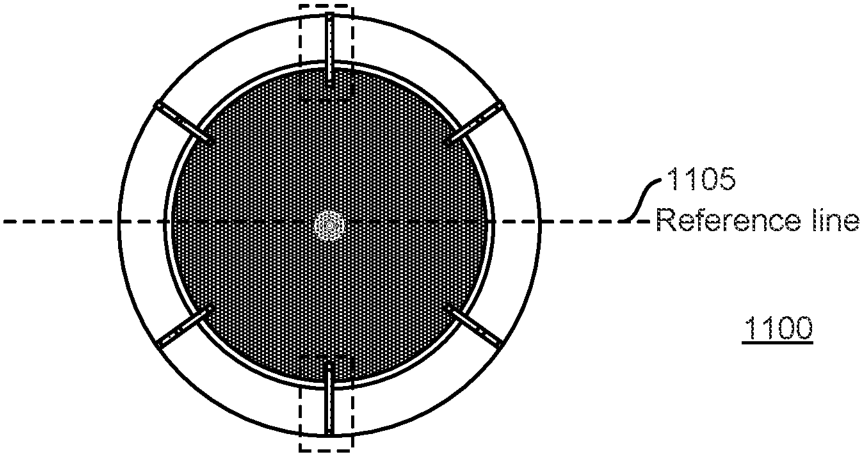
FIG. 15A is an illustration an implementation of an antenna in top view.
Figure 15B:
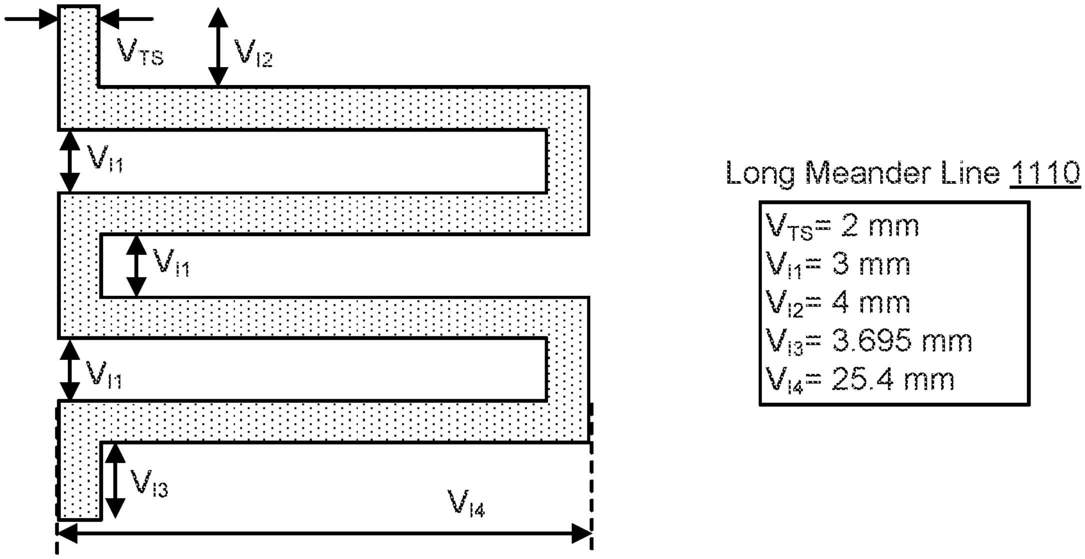
FIG. 15B is an illustration of a long meander line of the antenna of FIG. 15A.

Another feature is a long meander line. FIG. 15A is an illustration an implementation of an antenna 1100 in top view, and FIG. 15B is an illustration of a long meander line 1110 of the antenna 1100 of FIG. 15A. The long meander line 1110 provides impedance matching at the 700 MHz region with frequency shift at the 3.5 GHz region. Two long meander line 1110 vias are located 90 degrees from the reference line 1105, in an implementation.

With respect to FIG. 15B, $V_{TS}$=2 mm, $V_{l1}$=3 mm, $V_{l2}$=4 mm, $V_{l3}$=3.695 mm, and $V_{l4}$=25.4 mm.

The monocone antenna 1100 supports broadband frequency of 750 MHz-7.45 GHz. Additionally, the monocone antenna 1100 supports multiple applications, such as 5G, LTE, WiFi, GPS, DSRC/C-V2X.

The capacitive feed gap between the main monocone and capacitive dish may be optimized for best performance. In some implementations, the gap may be 0.06 mm, which provides improved performance near the 700 MHz region and mid 3.5 GHz region as compared to 0.1 mm of gap.

In an implementation, the gap of the grounding ring may be 2.6 mm.

Capacitive grounding posts may be used to optimize and improve performance in the 1.3-7.5 GHz region. The posts are effective on overall performance of the antenna.

Both short and long meander lines are used for optimization of frequency region of 0.7-2.5 GHz and 3-4 GHz.

Figure 16A:
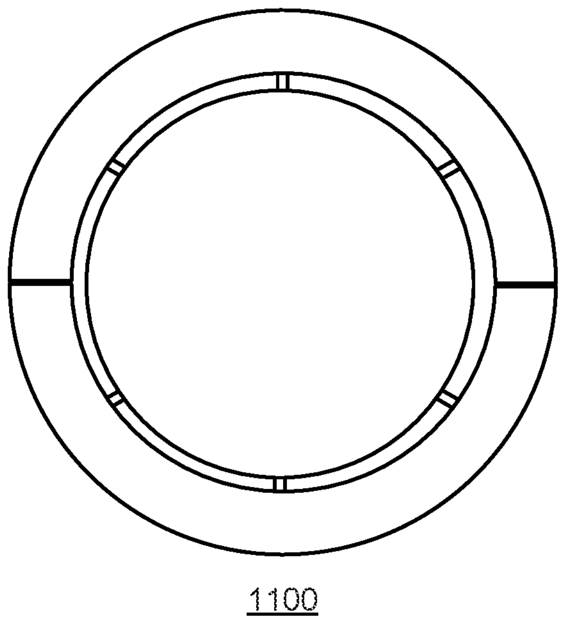
FIGS. 16A and 16B are illustration of an implementation of a prototype antenna in top view and perspective view, respectively.
Figure 16B:
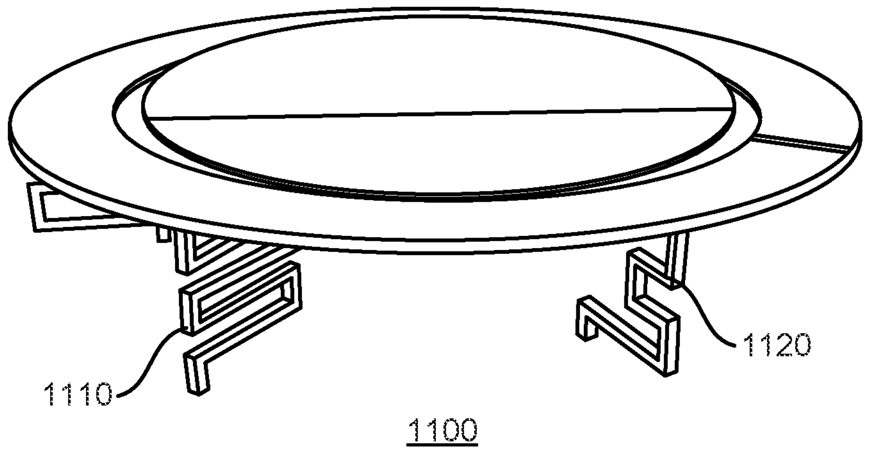

FIGS. 16A and 16B are illustration of an implementation of a prototype antenna 1100 in top view and perspective view, respectively. In an implementation, a monocone antenna may be fabricated with a 3D printer and conductive spray, such as PLA and resin material and MG Chemical 843AR Super Shield. The main cone may be printed with PLA material, in some implementations. The grounding ring and capacitive feed may be printed with resin material for precise and rigid structural support, in some implementations. Meander lines 1110, 1120 may be soldered with conductive spray without heat soldering process.

Figure 17A:
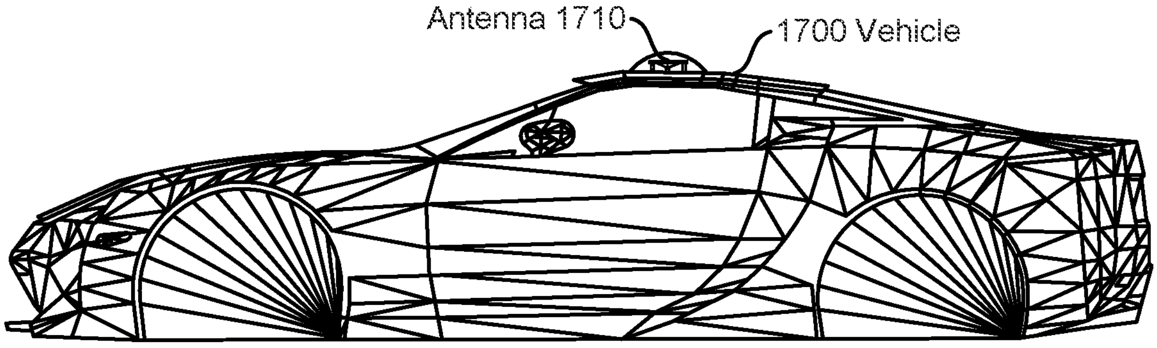
FIGS. 17A, 17B, and 17C show illustrations of an implementation of an antenna mounted on a vehicle in side view, top view, and perspective view, respectively.
Figure 17B:
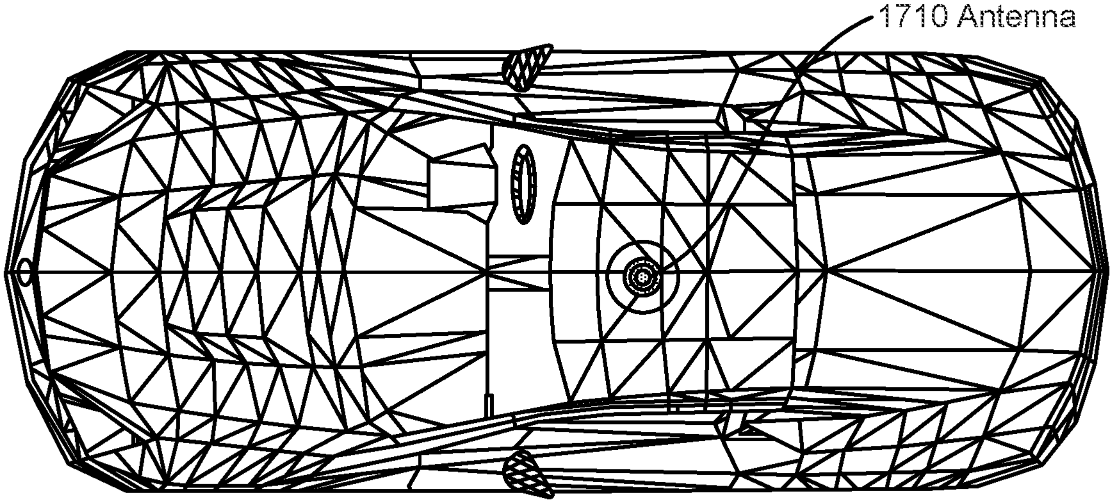
Figure 17C:
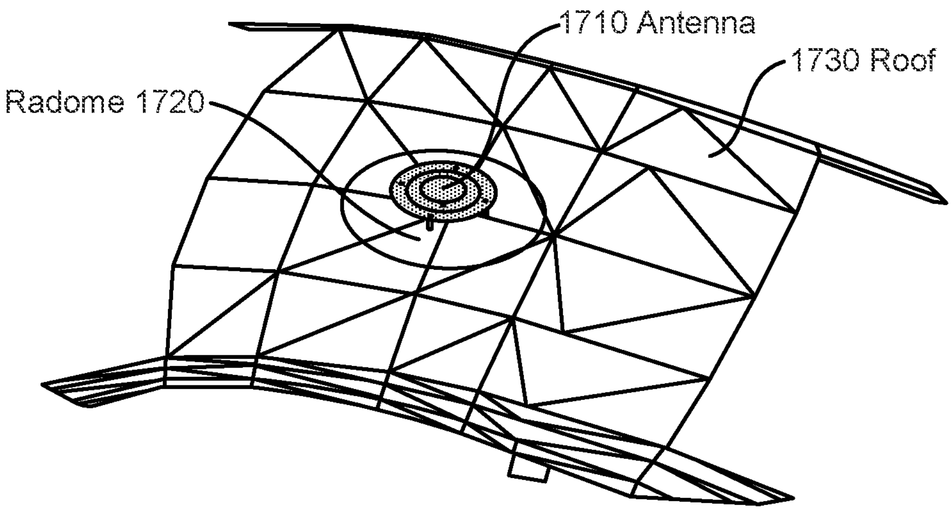

FIGS. 17A, 17B, and 17C show illustrations of an implementation of an antenna mounted on a vehicle in side view, top view, and perspective view, respectively.

The antenna 1710 is mounted on the roof 1730 of the vehicle 1700. In some implementations, the antenna 1710 may be enclosed in a radome 1720.

Although implementations of the antenna are described herein with respect to a vehicle such as a car, this is not intended to be limiting as the antenna can be used with (e.g., applied to) many other vehicles, device, and systems (e.g., an unmanned aerial vehicle (UAV) such as drone, an IoT device, a ship, an airplane, a helicopter, etc. and anywhere a big ground plane is present under the antenna). In some implementations, the antenna utilizes the ground plane as a part of the radiator.

Advantages include: (1) compact size for vehicular applications, (2) ultrawide band coverage by single antenna, (3) easy to fabricate through 3D printing, (4) low cost, (5) lightweight, (6) no need for matching circuit for antenna, and (7) directly surface mountable on a vehicle.

The antenna described herein is directly applicable to any vehicles for V2V (vehicle-to-vehicle), V2I (vehicle-to-infrastructure), V2N (vehicle-to-network), and V2P (vehicle-to-pedestrian) communication for road safety and awareness.

In an implementation, an antenna comprises: a monocone; a capacitive feed; a ground ring with a plurality of grounding vias; a plurality of capacitive bars; and a plurality of conductive cylinders.

Implementations may include some or all of the following features. The ground ring is a planar ring, the capacitive bars are conductive strips, and the conductive cylinders are cylindrical disks. The monocone is tapered and has a top hat that is covered. The ground ring is physically separated from the monocone. The capacitive feed is positioned at the bottom of the monocone. The antenna further comprises a planar top disposed on the monocone, wherein the conductive cylinders and the capacitive bars are positioned on the planar top, and wherein the capacitive bars are distributed over the planar top. The conductive cylinders are positioned between the capacitive bars. The antenna comprises four capacitive bars and wherein the ground ring is open-circuited or is short-circuited. The antenna comprises eight capacitive bars and wherein the ground ring is open-circuited or is short-circuited. The antenna is 3D printed and sprayed with metal particles. The antenna is configured to achieve ultrawide bandwidth, low-profile, omnidirectional radiation. The antenna is configured to support ultrawide bandwidth of 0.7 GHz to 6 GHz. The antenna is configured to allow GSM, CDMA, UMTS, LTE, GPS, WiFi, BT, DSRC, and C-V2X. The antenna is for V2X (vehicle-to-everything) wireless communication.

In an implementation, an antenna comprises: a monocone; a capacitive feed; a ground ring with a plurality of grounding vias; a plurality of first meander lines, each having a first size; and a plurality of second meander lines, each having a second size, wherein the second size is larger than the first size.

Implementations may include some or all of the following features. The ground ring is a planar ring, and each of the first meander lines is located on a first degree from a reference line, and each of the second meander lines is located on a second degree from the reference line, wherein the second degree is different from the first degree. The first meander lines are vertically positioned from the ground ring to the ground plane, and wherein the second meander lines are vertically positioned from the ground ring to the ground plane. The monocone is tapered and has a top hat that is covered, wherein the capacitive feed is positioned at the bottom of the monocone, and further comprising a planar top disposed on the monocone. The antenna is configured to support ultrawide bandwidth of 750 MHz to 7.45 GHz. The antenna is configured to allow GSM, CDMA, UMTS, LTE, GPS, WiFi, BT, DSRC, and C-V2X. The antenna is for V2X (vehicle-to-everything) wireless communication. Grounding posts are vertically positioned near the capacitive feed.

As used herein, the singular form "a," "an," and "the" include plural references unless the context clearly dictates otherwise.

As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An antenna comprising:

a monocone;

a capacitive feed;

a ground ring with a plurality of grounding vias;

a plurality of capacitive bars extending to the ground ring; and a plurality of conductive cylinders positioned between the capacitive bars, wherein the plurality of conductive cylinders increase capacitance between the capacitive bars.

2. The antenna of claim 1, wherein the ground ring is a planar ring, the capacitive bars are conductive strips, and the conductive cylinders are cylindrical disks.

3. The antenna of claim 1, wherein the monocone is tapered and has a top hat that is covered.

4. The antenna of claim 1, wherein the ground ring is physically separated from the monocone.

5. The antenna of claim 1, wherein the capacitive feed is positioned at the bottom of the monocone.

6. The antenna of claim 1, further comprising a planar top disposed on the monocone, wherein the conductive cylinders and the capacitive bars are positioned on the planar top, and wherein the capacitive bars are distributed over the planar top.

7. The antenna of claim 1, further comprising four capacitive bars and wherein the ground ring is open-circuited or is short-circuited.

8. The antenna of claim 1, further comprising eight capacitive bars and wherein the ground ring is open-circuited or is short-circuited.

9. The antenna of claim 1, wherein the antenna is 3D printed and sprayed with metal particles.

10. The antenna of claim 1, wherein the antenna is configured to achieve ultrawide bandwidth, low-profile, omnidirectional radiation.

11. The antenna of claim 1, wherein the antenna is configured to support ultrawide bandwidth of 0.7 GHz to 6 GHz.

12. The antenna of claim 1, wherein the antenna is configured to allow GSM, CDMA, UMTS, LTE, GPS, WiFi, BT, DSRC, and C-V2X.

13. The antenna of claim 1, wherein the antenna is for V2X (vehicle-to-everything) wireless communication.

* * * * *